United States Patent
Syomichev et al.

(10) Patent No.: US 11,044,336 B2
(45) Date of Patent: Jun. 22, 2021

(54) SYSTEMS, METHODS, AND APPARATUSES FOR CAPTURING DATA CHANGE EVENTS IN A CLOUD BASED COMPUTING ENVIRONMENT

(71) Applicant: salesforce.com, inc., San Francisco, CA (US)

(72) Inventors: Alexey Syomichev, Westport, CT (US); David Angulo, Boulder, CO (US)

(73) Assignee: salesforce.com, inc., San Francisco, CA (US)

( * ) Notice: Subject to any disclaimer, the term of this patent is extended or adjusted under 35 U.S.C. 154(b) by 346 days.

(21) Appl. No.: 15/882,863

(22) Filed: Jan. 29, 2018

(65) Prior Publication Data

US 2019/0238653 A1    Aug. 1, 2019

(51) Int. Cl.
| | |
|---|---|
| *H04L 29/08* | (2006.01) |
| *G06F 3/06* | (2006.01) |
| *G06F 16/25* | (2019.01) |
| *G06F 16/17* | (2019.01) |
| *G06F 16/182* | (2019.01) |

(52) U.S. Cl.
CPC ........ *H04L 67/2852* (2013.01); *G06F 3/0656* (2013.01); *G06F 16/1734* (2019.01); *G06F 16/1844* (2019.01); *G06F 16/252* (2019.01); *H04L 67/1004* (2013.01); *H04L 67/1095* (2013.01); *H04L 67/1097* (2013.01)

(58) Field of Classification Search
CPC ......... G06F 9/45558; G06F 2009/4557; G06F 9/5077; G06F 16/29; G06F 16/5866; G06F 16/1844; G06F 16/1734; G06F 3/0656; H04L 67/2852; H04L 67/1004; H04L 67/1095; H04L 67/1097
See application file for complete search history.

(56) References Cited

U.S. PATENT DOCUMENTS

| | | | |
|---|---|---|---|
| 8,412,810 B1 * | 4/2013 | Tompkins | G06F 9/45558 709/201 |
| 9,020,888 B1 * | 4/2015 | Kiefer | G06F 16/27 707/610 |
| 2014/0301388 A1 * | 10/2014 | Jagadish | H04L 45/7453 370/389 |
| 2017/0357667 A1 * | 12/2017 | Auch | G06F 11/14 |

* cited by examiner

*Primary Examiner* — Truong V Vo
(74) *Attorney, Agent, or Firm* — Elliot, Ostrander & Preston, P.C.

(57) ABSTRACT

A software application executing on a selected application server in a cluster of application servers stores in a buffer in a memory of the selected application server a payload of data and a corresponding key. The application transfers a copy of the payload of data and the corresponding key to a selected second application server in the cluster, and creates a record in an entry in a transaction log stored in a database to which the cluster of applications servers has access, the record including: the corresponding key, a first value identifying the selected second application server to which the copy of the payload of data and corresponding key were transferred, and a second value identifying the selected first application server in which the payload of data and corresponding key were stored.

27 Claims, 14 Drawing Sheets

SYSTEMS, METHODS, AND APPARATUSES FOR CAPTURING DATA CHANGE EVENTS IN A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for capturing data change events in a cloud based computing environment. Embodiments may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

Current state of the art cloud computing systems may configure a number of application server processes ("application servers") in a group, or cluster, or pod, each with access to a persistent data store, such as a database, or a particular database partition. (In the context of storing data in a computer system, a "persistent data store" means that the data survives after the process with which it was created has ended. In other words, for a data store to be considered persistent, it must write to a non-volatile storage device). When a data change event occurs, such as when a particular application server in the cluster conducts a transaction with the persistent data store that changes a value in the persistent data store, a payload of data that includes that data change typically is stored in a memory cache of the application server, for any one of a number of purposes, such as replication or integration with other services. For example, when a database change event occurs, such as when a particular application server in the cluster conducts a write to a database entry that changes a value in the entry, a payload of data that includes that change typically is stored in a memory cache of the application server, for any one of a number of purposes, such as replication or integration with other services. A copy of the payload of data is also transferred from the application server to the cache of at least one other application server in the cluster so that in the event of a failure of the application server, a record of the data change event is not lost and can still be used by or for replication or integration services or processes. It is not known which other application server(s) in the cluster will need a copy of the payload of data, for whatever purpose, and so the application server sends a copy of the payload to one or more randomly selected application server(s) in the cluster, for example, according to a distribution policy. The present state of the art may therefore benefit from the systems, methods, and apparatuses for capturing data change events in a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
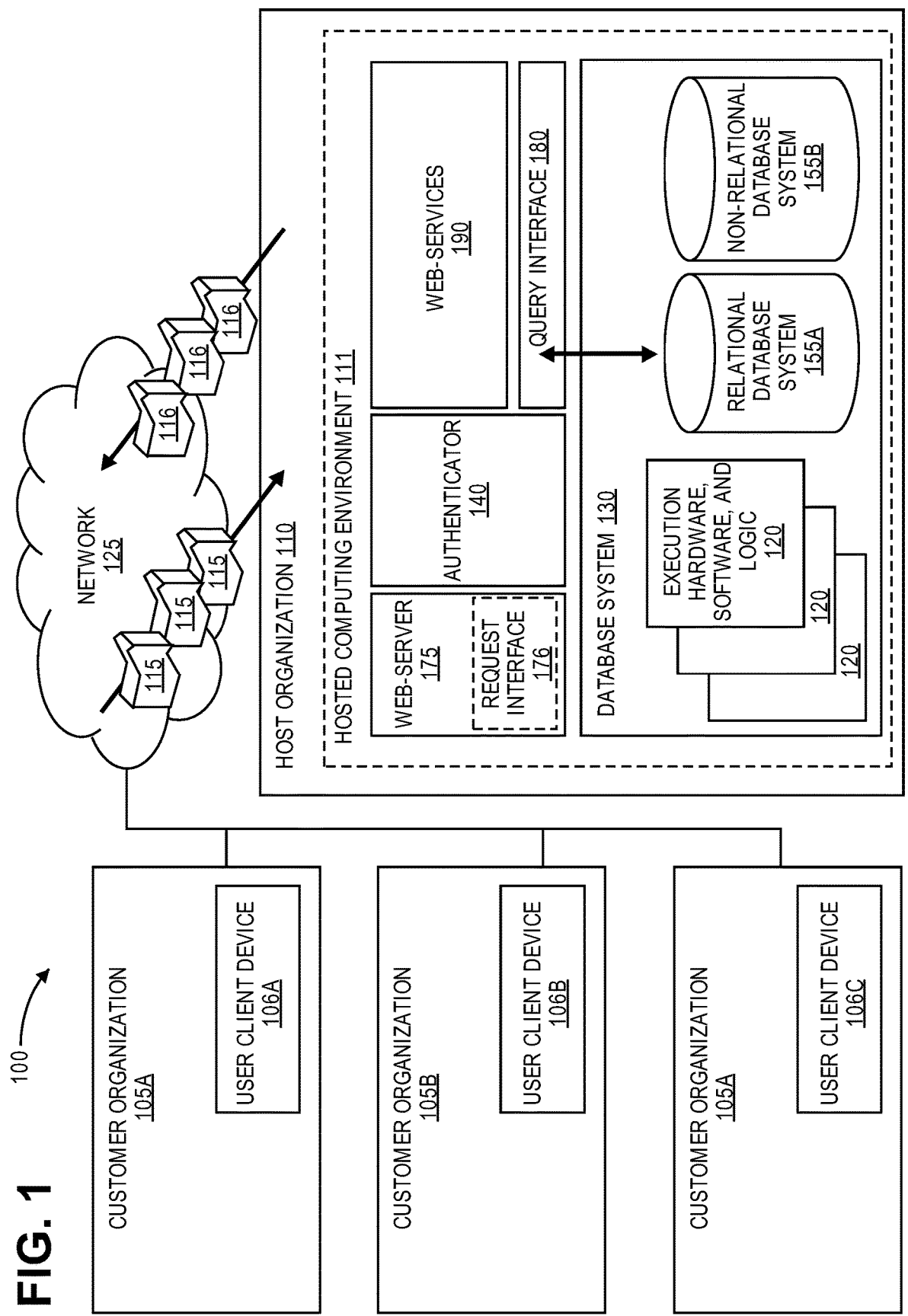
FIG. 1 depicts an exemplary architecture in accordance with described embodiments.

Described herein are systems, methods, and apparatuses for implementing systems, methods, and apparatuses for capturing data change events within a cloud based computing environment. Such an exemplary system, having a cluster of application servers, each having at least a processor and a memory therein, and access to a persistent data store, stores in a buffer in the memory of a selected first application server a payload of data associated with a transaction performed by a software application executing on the application server with the persistent data store and a corresponding key associated with when the transaction occurred. For instance, such an exemplary system, having a cluster of application servers, each having at least a processor and a memory therein, and access to a database, stores in a buffer in the memory of a selected first application server a payload of data associated with a transaction performed by a software application executing on the application server with the database and a corresponding key indicating a logical point in time at which the associated transaction was committed to the database. The software application transfers a copy of the payload of data and the corresponding key to a selected second application server in the cluster, and creates a record in an entry in a transaction log stored in a database to which the cluster of applications servers has access, the record including: the corresponding key, a first value identifying the selected second application server to which the copy of the payload of data and corresponding key were transferred, and a second value identifying the selected first application server in which the payload of data and corresponding key were stored.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a persistent data store maintains data for storage, retrieval, and modification.

The persistent data store may be a database system 130 that includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments. In other embodiments, the persistent data store may be any library of user or subscriber created and/or maintained content, such as videos, pictures, social media content, etc.

Certain embodiments may utilize a client-server computing architecture to supplement features, functionality, or computing resources for the persistent data store, such as database system 130, or alternatively, a computing grid, or a pool of work servers, or some combination of hosted computing architectures may be utilized to carry out the computational workload and processing demanded of the host organization 110 in conjunction with the persistent data store.

The persistent data store, such as database system 130, depicted in the embodiment shown includes a plurality of underlying hardware, software, and logic elements 120 that implement data storage and retrieval functionality and a code execution environment within the host organization 110.

For example, in accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the persistent data store, such as database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user client device 106A-C or machine originating such data requests 115.

The query interface 180 is capable of receiving and executing requested queries against the persistent data store, such as the databases and storage components of the database system 130, to return a result set, response, or other requested data in furtherance of the methodologies described. The query interface 180 additionally provides functionality to pass queries from web-server 175 into the persistent data store, such as database system 130 for execution against the databases 155 for processing search queries, or into the other available persistent data stores of the host organization's computing environment 111. In one embodiment, the query interface 180 implements an Application Programming Interface (API) through which queries may be executed against the databases 155 or the other persistent data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is web-services 190 capable of communicating with other web-services platform(s) 193 regardless of whether such web-services platforms are hosted by the same host organizations 110 or hosted by different host organizations.

As used herein, a database transaction, or simply, transaction, is a logical, atomic unit of work that contains one or more SQL statements. A transaction groups SQL statements so that they are either all committed, which means they are applied to the database, or all rolled back, which means they are undone from the database. Typically, every transaction has a unique identifier called a transaction identifier ("transaction ID"). Database transactions generally comply with the basic properties sometimes referred to as ACID properties. ACID is an acronym for Atomicity, Consistency, Isolation, and Durability. Atomicity means that all tasks of a transaction are performed, or none is performed. In other words, there are no partial transactions. For example, if a transaction starts updating selected rows in a database, but the transaction fails before all the rows are updated, then the database rolls back the changes to the rows that were updated prior to the failure. Consistency means the transaction takes the database from one consistent state to another consistent state. For example, in a banking transaction that debits a savings account and credits a checking account, a failure must not cause the database to credit only one account, which would lead to inconsistent data. Isolation suggests that the effect of a transaction is not visible to other transactions until the transaction is committed. For example, one user updating a table in the database does not see the uncommitted changes to that table made concurrently by another user. Thus, it appears to users as if transactions are executing serially. Finally, Durability means that changes made by committed transactions are permanent. After a transaction completes, the database ensures through its recovery mechanisms that changes from the transaction are not lost.

References are made herein to a system change number (SCN). An SCN is a logical, internal time stamp used by a database. SCNs order events that occur within the database, which is necessary to satisfy the ACID properties of a transaction, as described above. A database uses SCNs to mark the time before which all changes are known to be on or recorded to disk so that any recovery operation avoids trying to undo or repeat such changes. In one embodiment, SCNs occur in a monotonically increasing sequence. A database may use an SCN like a clock because an observed SCN indicates a logical point in time and repeated observations return equal or greater values. If one event has a lower SCN than another event, then it occurred at an earlier time with respect to the database. Several events may share the same SCN, which means that they occurred at the same time with respect to the database.

Every transaction has an SCN. For example, if a transaction updates a row in a table of the database, then the database records the SCN at which this update occurred. Other modifications in this transaction have the same SCN. When a transaction commits, the database records an SCN for this commit and provides a copy of such to the application process that sent instruction(s) to the database to conduct the transaction.

Figure 3A:
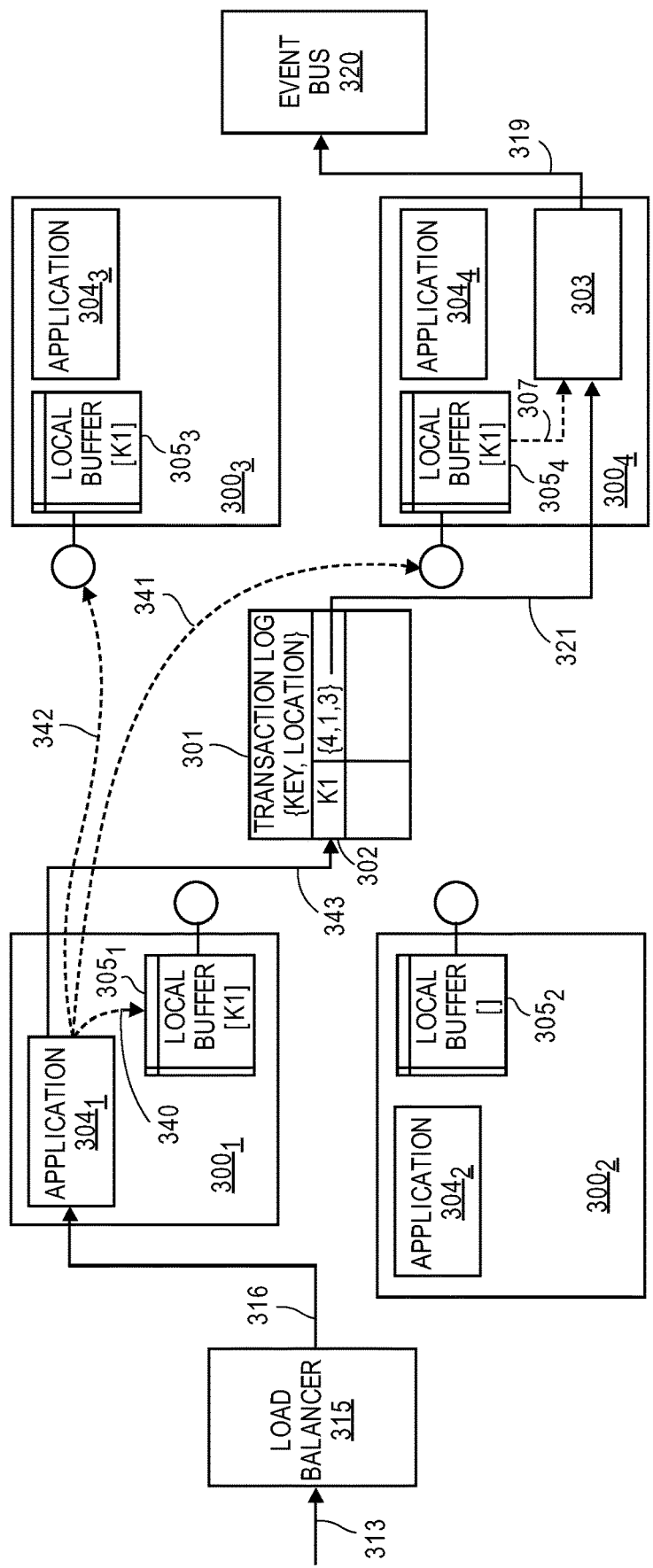
FIG. 3A depicts a system and process in accordance with one aspect of an embodiment of the invention.

With reference to FIG. 3A, an embodiment of the invention operates within a cluster 300 of application server computing platforms, or simply, application servers, $300_1$, $300_2$, $300_3$, and $300_4$. FIG. 3A illustrates an example cluster with four application servers, but embodiments contemplate a cluster having two or more application servers. The cluster of application servers work together, as a group, for example, to service, or provide, cloud-based computing applications for cloud computing subscribers. The cluster typically has a persistent data store, such as a database (not shown in FIG. 3A), that is accessible to each of the application servers in the cluster. The persistent data store, e.g., database, may be partitioned so that certain subscribers and/or certain application servers have access to one partition, or portion, of the persistent data store, but not other partitions. (References hereinafter to database transactions may likewise apply to transactions with a database partition). Each application server has a local memory store $305_1$, $305_2$, $305_3$, and $305_4$, and provides a computing platform for execution of one or more hosted applications $304_1$, $304_2$, $304_3$, and $304_4$. The applications executing on each application server can store information in a local buffer in a respective local memory 305.

Client computing devices, e.g., cloud computing services subscribers, send requests to the cluster of application servers at 313. A load balancer 315 receives the requests and in each case selects an application server in the cluster to process the request, and respond, as the case may be. The load balancer selects one of the application servers over others in the cluster based on various factors, such as availability of an application server, or availability of resources therein (e.g., computing resources), whether an application server is already executing an application that is servicing requests relating to an incoming request, cloud computing services subscriber, etc. A load balancer may be a separate computing platform executing, for example, a load-balancing software application that front-ends the cluster, or the load-balancing functionality may be subsumed by an application server in the cluster. An application server may be elected, or selected, for performing the load balancing functionality, either automatically by a software routine participated in by at least two application servers in the cluster, or manually by an administrator.

The cluster of application servers may communicate with other systems external to, or outside, the cluster. For example, a cloud computing services subscriber may use the cloud computing services provided by the cluster, but also have a need for communication between the cloud computing services provided by the cluster and a system outside the cluster, such as a legacy or corporate mainframe computing system. This might be useful for any number of reasons, such as for purposes of integration, replication, or verification of data, actions performed on or with the data, and/or events involving the data, or involving change to the data, such as database transactions that change data, processed by application servers in the cluster. FIG. 3A depicts an event bus 320, over which copies of data changed by transactions performed by the application servers in the cluster area transmitted as depicted at 319 to an external system such as described above.

Just as one application server in the cluster may be elected or selected to perform load balancing services, an application server in the cluster may also be elected or selected to perform the function 303 of capturing events that occur in the cluster, e.g., capturing changed data, for example, a change to data in a transaction committed to the database, and exporting or transferring a record or such to an external system. An application server is selected or elected to perform this capturing and exporting function 303 according to a protocol or algorithm that selects the application server based on any number of factors, such as topology of the cluster, operational characteristics of one or more of the application servers in the cluster at a given point in time, the physical characteristics of the application servers, the cluster, or portions thereof, stability/reliability of power supplied to different application servers, or banks or groups of application servers, within the cluster, etc. This election or selection may be performed automatically, by a distributed software application executing on and in communication with the application servers, or manually, by an administrator. The election or selection may be static or dynamic. A second, or secondary, application server may be selected or elected as a backup to perform the changed data capturing and exporting function, in the event the selected, primary, application server fails to provide the changed data exporting function. The secondary application server may be identified either before such failure occurs, or on the fly (when the primary application server fails or the changed data capturing and exporting function fails), based on factors such as described above. Ideally, the changed data capture and export function operates seamlessly and transparently in the face of a failover situation where the primary application server providing the changed data capturing and exporting function ceases capturing and/or exporting changed data for any reason, and the secondary application server automatically takes over the function, with all application servers in the cluster aware of, and even participating in, the decision to switch, and the switch itself, from the primary to secondary application server.

In one embodiment, an application server selected to capture and export changed data captures a copy of all transactions between the application servers in the cluster and the persistent data store, an exports the transactions in the order that they were conducted with the persistent data store, using a key to sequence the exporting of transactions to the external system, so that the order in which the transactions are exported generally complies with order in which they were conducted with the persistent store. For example, an application server selected to capture and export changed data may capture a copy of all committed transactions between the application servers in the cluster and a database, and exports the transactions in the order that they were committed to the database, using the above described SCN to sequence the exporting of transactions to the external system, so that the order in which the committed transactions are exported generally complies with at least the consistency property referred to above in the discussion of ACID properties.

FIGS. 4-7 depict flow diagrams illustrating various aspects of methods according to embodiments of the invention. These methods may be performed by processing logic that may include hardware (e.g., circuitry, dedicated logic, programmable logic, microcode, etc.) and software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services 190, and its database system 130 as depicted at FIG. 1, and other systems and components as described herein in FIGS. 3A-3C, 9A, and 9B, may implement the described methodologies. Some of the blocks and/or operations listed below are optional in accordance with certain embodiments. The numbering of the blocks presented is for the sake of clarity and not intended to prescribe an order of operations in which the various blocks must occur.

Figure 4:
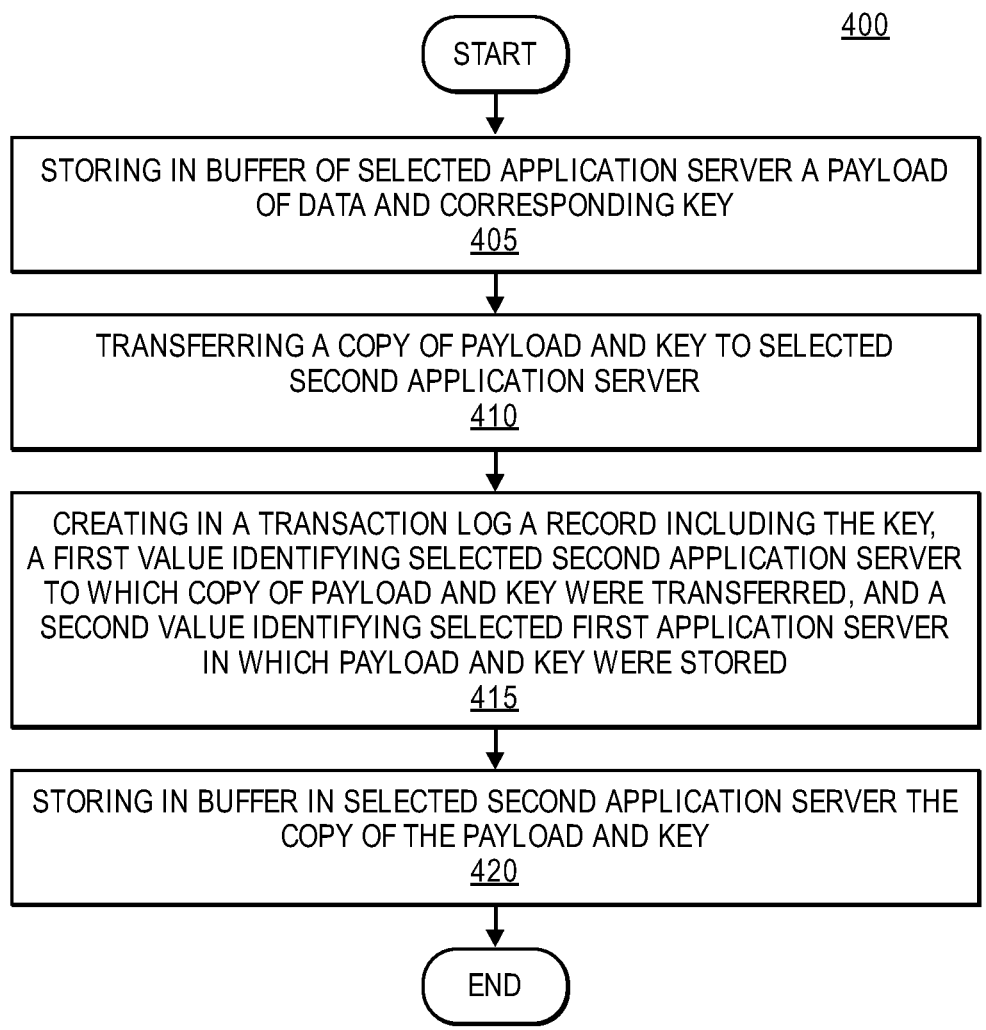
FIG. 4 is a flow chart of one process in accordance with an embodiment of the invention.

With reference to FIGS. 3A and 4, in one embodiment of the invention 400 involving a cluster of application servers 300, each having at least a processor and a memory therein, and access to a persistent data store, such as a database or partition thereof, processing logic receives user input at a load balancer 315, for example, from a cloud computing services subscriber or client. The load balancer may be a stand-alone device with processing logic to receive and transfer client requests to one of the application servers in the cluster. In another embodiment, the load balancer logic is in one of the application servers that handles that function for the cluster. In either case, the load balancer selects a first application server in the cluster to which to transmit the user input, for example, application server $300_1$. The load balancer then transmits the user input to the selected application server at 316. A software application $304_1$ executing on the application server may then conduct a transaction with the persistent data store, for example, the database, responsive to the user input. Once the transaction is completed, for example, one a transaction is committed to the database, the software application $304_1$ executing on the selected application server $300_1$, at block 405, stores in a buffer $305_1$ in the memory of the selected application server a payload of data associated with the transaction performed by the software application, as depicted at 340. The transaction may have changed data in the persistent data store, either modifying existing data in the persistent data store, adding new data to the persistent data store, or deleting existing data in the persistent data store, through one or more read and/or write operations conducted with the persistent data store. For example, if the persistent data store is a database, the transaction may have changed data in the database, either modifying data in the database, adding new data to the database, or deleting existing data in the database, through one or more read and/or write operations to/from the database. The software application $304_1$ also stores in the buffer $305_1$, at block 405, a corresponding key ("K1" in FIG. 3A) indicating when the associated transaction was conducted or completed. In the database example, the he software application $304_1$ stores in the buffer $305_1$, at block 405, a corresponding key ("K1" in FIG. 3A) indicating a logical point in time at which the associated transaction was committed to the database. In the database example, this key is a System Change Number (SCN) as discussed above. FIG. 2B depicts an example format 250 of the buffer entry in which a key 205 and payload of data 255 is stored by processing logic at block 405. In one embodiment, the key is used an index to locate the payload of data in a subsequent search of the buffer, as described below. The payload itself may also comprise information 255A indicating the type of operation performed on data 255B in the persistent data store, such as data committed to the database in the case of a database transaction.

At logic block 410, the embodiment then transfers, as depicted at 341, a copy of the payload of data and the corresponding key to a selected second application server in the cluster, in this example, application server $300_4$. The selected second application server in the cluster is elected, or selected, to perform the function 303 of capturing events that occur in the cluster, e.g., capturing changed data, for example, a change to data that has been committed to the database, and exporting or transferring a record or such to an external system. This selected second application server in the cluster is elected to perform this function by the application servers in the cluster according to a protocol or algorithm and/or based on a topology of the cluster, operational characteristics, and/or other criteria. In one embodiment, the copy of payload of data is stored at logic block 420 in a buffer $305_4$ in the memory of the selected second application server $300_4$.

Optionally, in one embodiment, the embodiment further transfers, as depicted at 342, a second copy of the payload of data and the corresponding key to a selected third application server in the cluster, in this example, application server $300_3$. The selected third application server in the cluster is elected, or selected, as a backup to perform the function 303 of capturing events that occur in the cluster and exporting or transferring a record or such to an external system, in the event that the selected second application server, or the capturing and exporting function performed by the selected second application server, fails or otherwise ceases to operate. This third application server in the cluster is elected as the backup application server in the cluster to perform the function according to a protocol or algorithm and/or based on a topology of the cluster, operational characteristics, and/or other criteria. The second copy of the payload of data is stored in a buffer $305_3$ in the memory of the selected third application server $300_3$.

Figure 2A:
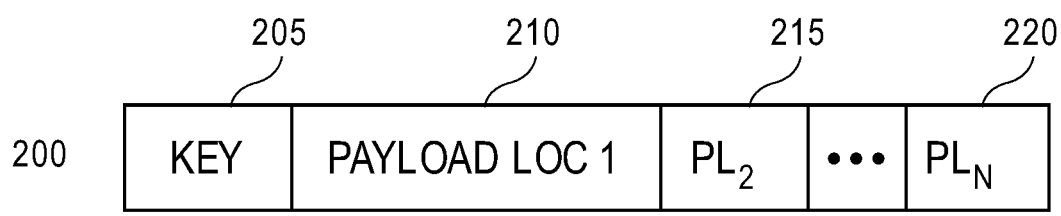
FIG. 2A illustrates a record in an entry of a database accessible to a cluster of application servers in accordance with an embodiment of the invention.
Figure 2B:
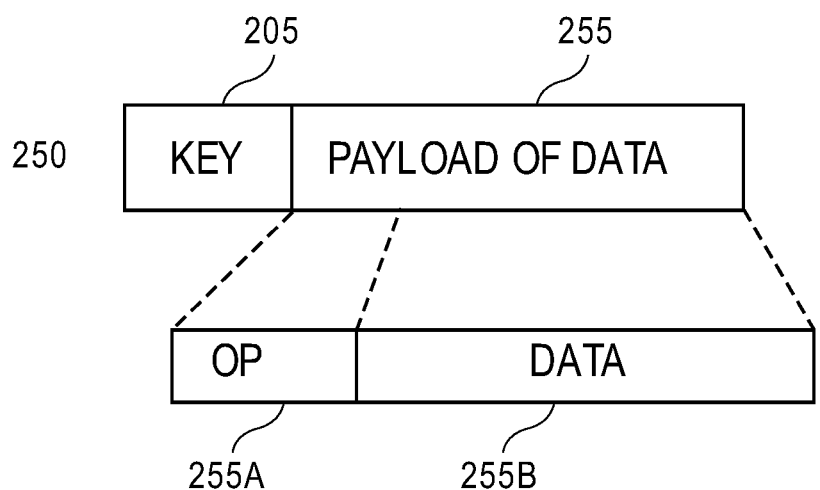
FIG. 2B illustrates a record in an entry of a database accessible to a cluster of application servers in accordance with an embodiment of the invention.

At logic block 415, and further with reference to FIG. 2A, the software application $304_1$ also transfers, as depicted at 343, the corresponding key, "K1" (but not the payload of data), to a database accessible to the applications servers in the cluster (not shown in FIG. 3A). In one embodiment, this database may be the same database with which application servers in the cluster conduct transactions of behalf of cloud computing services subscribers. In another embodiment, the database is a separate database. The software application $304_1$ creates a record 200 in an entry 302, e.g., the next available entry, in a transaction log 301 stored in the database.

The record 200 includes the corresponding key 205 (to be used later as an index to lookup the record as described below), a first value 210 (e.g., a pointer with a value of "4") identifying the selected second application server $300_4$ to which the copy of the payload of data and corresponding key were transferred by processing logic 410 as depicted at 341, and a second value 215 (e.g., a pointer with a value of "1") identifying the selected first application server $300_1$ in which the payload of data and corresponding key were stored by processing logic 405 as depicted at 340. Optionally, if the embodiment further transfers, as depicted at 342, a second copy of the payload of data and the corresponding key to a selected third application server in the cluster (e.g., application server $300_3$), then the record may include a third value 220 (e.g., a pointer with a value of "3") identifying the selected third application server $300_3$ to which the second copy of the payload of data and corresponding key were transferred as depicted at 342.

In one embodiment, the logic block 420 that stores the copy of the payload of data and the corresponding key in the buffer of the selected second application server is performed by a software application executing on the selected second application server. While FIG. 4 depicts logic block 420 being processed after logic block 415, it is contemplated that the logic blocks can be processed in opposite order, or concurrently, or during partially overlapping time frames, depending on when application $304_1$ creates the record in the transaction log at logic block 415 and when application server $300_4$ stores the copy of payload of data at logic block 420 in the buffer $305_4$.

Figure 3B:
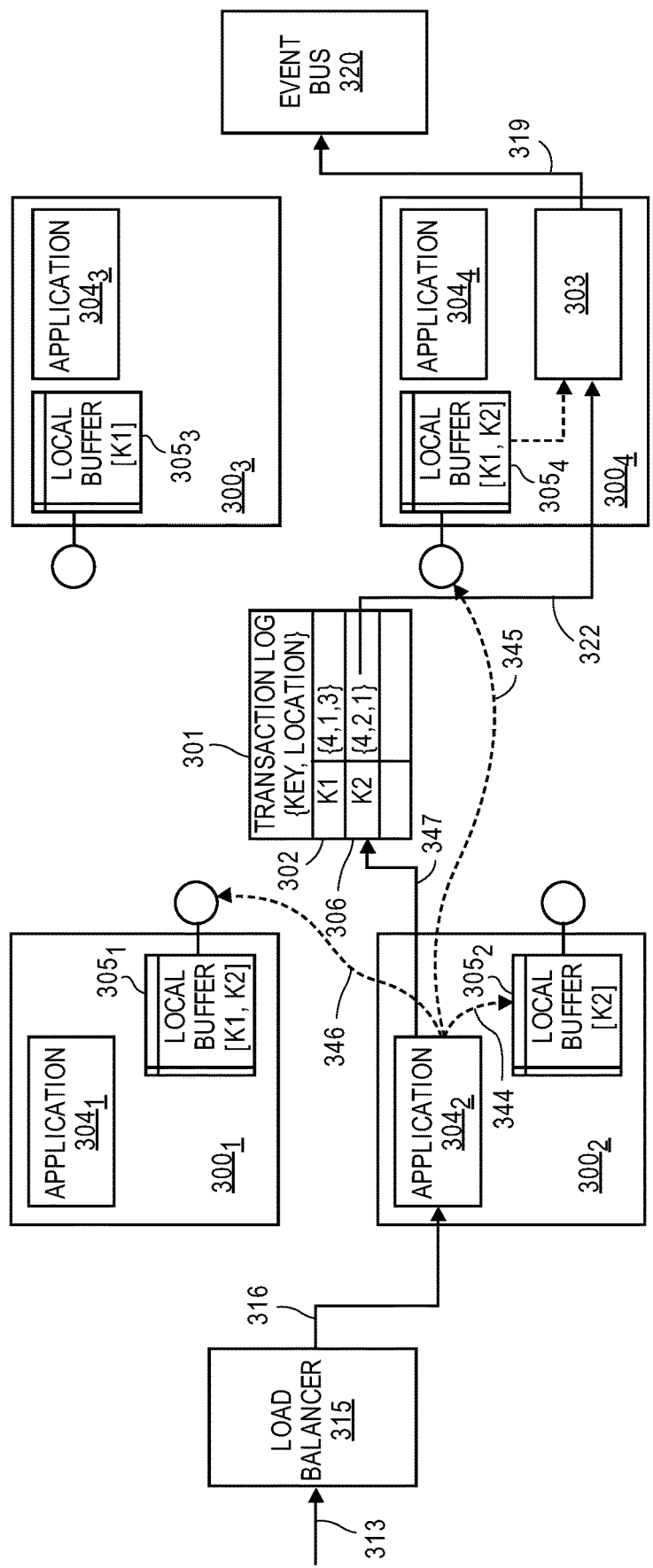
FIG. 3B depicts a system and process in accordance with an aspect of an embodiment of the invention.

With reference to FIGS. 3B and 4, in one embodiment of the invention 400, processing logic receives further user input at load balancer 315. In this case, the load balancer may select a different application server in the cluster to which to transmit the user input, for example, application server $300_2$. The load balancer then transmits the user input to the selected application server $300_2$ as depicted at 316. A software application $304_2$ executing on the application server $300_2$ may then conduct a transaction with the persistent data store, responsive to the user input. Once the transaction is completed, the software application $304_2$, at block 405, stores in a buffer $305_2$ a payload of data associated with the transaction performed by the software application with the persistent data store, as depicted at 344. The software application $304_2$ also stores in the buffer, at block 405, a corresponding key ("K2" in FIG. 3B) indicating, when the transaction was completed, for example, in the case of a database transaction, a logical point in time at which the associated transaction was committed to the database, as depicted at 344. In the database transaction example, this key is a System Change Number (SCN) as discussed above, and is greater than the key K1, indicating a later logical point in time at which this transaction was committed to the database relative to the logical point in time at which the transaction associated with key K1 was committed to the database.

At logic block 410, the embodiment then transfers, as depicted at 345, a copy of the payload of data and the corresponding key to the selected second application server in the cluster, in this example, application server $300_4$, that hosts the software application 303 performing the changed data capturing and exporting function. In one embodiment, the copy of payload of data is stored at logic block 420 in a buffer $305_4$ in the memory of the selected second application server $300_4$. Note now that buffer $305_4$ contains two payloads—the first associated with, and indexed by, key K1, and the second associated with and indexed by key K2.

Optionally, in one embodiment, the embodiment further transfers, as depicted at 346, a second copy of the payload of data and the corresponding key to a selected third application server in the cluster, in this example, application server $300_1$. The selected third application server in the cluster may be elected, or selected, as a backup to perform the function 303 of capturing events that occur in the cluster and exporting or transferring a record or such to an external system, in the event that the selected second application server, or the capturing and exporting function performed by application software executing on the selected second application server, fails or otherwise ceases to operate. The second copy of the payload of data is stored in the buffer $305_1$ in the memory of the selected third application server $300_1$. Note that the selected third application server in the cluster elected to perform function 303 is application server $300_1$ at this point in time, whereas the selected third application server in the cluster elected to perform function 303 was application server $300_3$ at the earlier point in time (when the embodiment transferred, as depicted at 342, a second copy of a previous payload of data and the corresponding key to the then selected third application server in the cluster, which, in the example discussed above, was application server $300_3$).

At logic block 415, the software application $304_2$ transfers, as depicted at 347, the corresponding key, K2, to the database accessible to the applications servers in the cluster. The software application $304_2$ creates a record 200 in an entry 306, e.g., the next available entry, in the transaction log 301 stored in the database.

The record 200 includes the corresponding key 205, having a value of "K2", a first value 210 ("4") identifying the selected second application server $300_4$ to which the copy of the payload of data and corresponding key were transferred by processing logic 410, as depicted at 345, and a second value 215 ("2") identifying the selected first application server $300_2$ in which the payload of data and corresponding key were stored by processing logic 405, as depicted at 344. Given the embodiment further transferred, as depicted at 346, a second copy of the payload of data and the corresponding key to the selected third application server $300_1$, the record further includes a third value 220 ("1") identifying the selected third application server $300_1$ to which the second copy of the payload of data and corresponding key were transferred.

The process described above details how, in one embodiment, a payload of data is stored in a buffer in a memory of an application server, along with one or more copies being stored in respective buffers in memories of other application servers, in the cluster, and how a record of where those payloads are stored at various application servers in the cluster is maintained in a transaction log in a database accessible to the application servers in the cluster. The process described below details how, once the payload is stored, the payload, or copy thereof, is thereafter located, retrieved, and exported or transferred to an external system, in key order.

Figure 5:
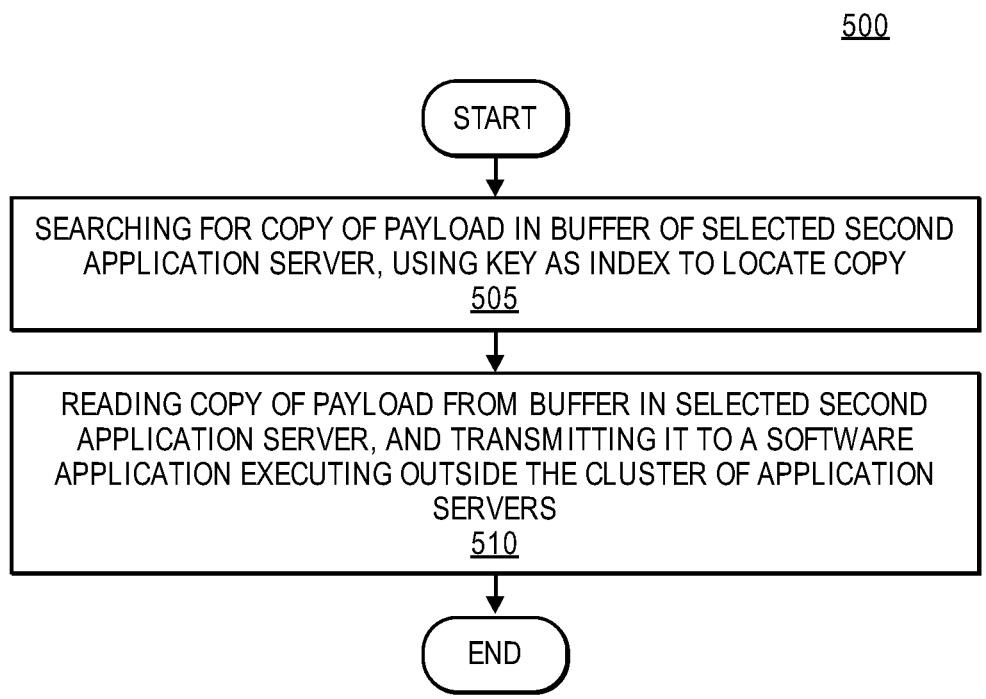
FIG. 5 is a flow chart of another process in accordance with an embodiment of the invention.

With reference to FIGS. 3A, 3B, and 5, in one embodiment of the invention 500, processing logic 505, such as a software application 303 executing on the selected second application server $300_4$, searches first for copies of payloads of data in the memory buffer $305_4$ in the selected second application server, using a corresponding key as an index to locate the copy that should be exported next. In particular, the selected second application server $300_4$ searches for a copy of a payload of data with the lowest key value, indicating it should be exported first to maintain consistency of the events being exported with respect to when the events were completed, for example, committed to a database. At the point in time depicted in FIG. 3A, when only application $304_1$ has transferred a copy of a payload of data and corresponding key K1 to local buffer $305_4$, processing logic block 510 of application 303 reads the only copy of a payload of data in its buffer, the payload associated with key K1, as depicted at 307. The embodiment then transfers it, as depicted at 319, to an event bus 320, where it may be delivered, for example, to a software application executing outside the cluster of application servers. After reading the copy of the payload of data, the entry in the local buffer $305_4$ is made available to store a new key+payload pair associated with another completed transaction.

As another example, at the point in time depicted in FIG. 3B, both application $304_1$ has transferred a copy of a payload of data and corresponding key K1 to buffer $305_4$, and application $304_2$ has transferred a copy of a payload of data and corresponding key K2 to buffer $305_4$. In one embodiment, application 303 first reads the copy of the payload of data associated with the lowest key value, K1, as depicted at 307, and transfers it, as depicted at 319, to an event bus 320, where it may be delivered, for example, to a software application executing outside the cluster of application servers. After reading the copy of the payload of data associated with key value K1, the entry in the buffer $305_4$ is made available to store a new key+payload pair associated with another completed transaction. The application 303 next reads the copy of the payload of data associated with the lowest key value, K2, and transfers it to event bus 320. After reading the copy of the payload of data associated with key value K2, the entry in the buffer $305_4$ is made available to store a new key+payload pair associated with another completed transaction. In an alternative embodiment, processing logic 505 and 510 work in a "batch mode", where application 303 reads all or a plurality of copies of payloads of data in buffer $305_4$, as depicted at 307, and transfers each copy, as depicted at 319, to an event bus 320, in the order of the respective keys associated with the copies, exporting the payload with the lowest value key first, then exporting the payload with the next lowest value key, and so on. After the batch mode operation is completed, all entries in buffer $305_4$ and the corresponding entries in the transaction log 301 are deleted to avoid processing them again.

Figure 6A:
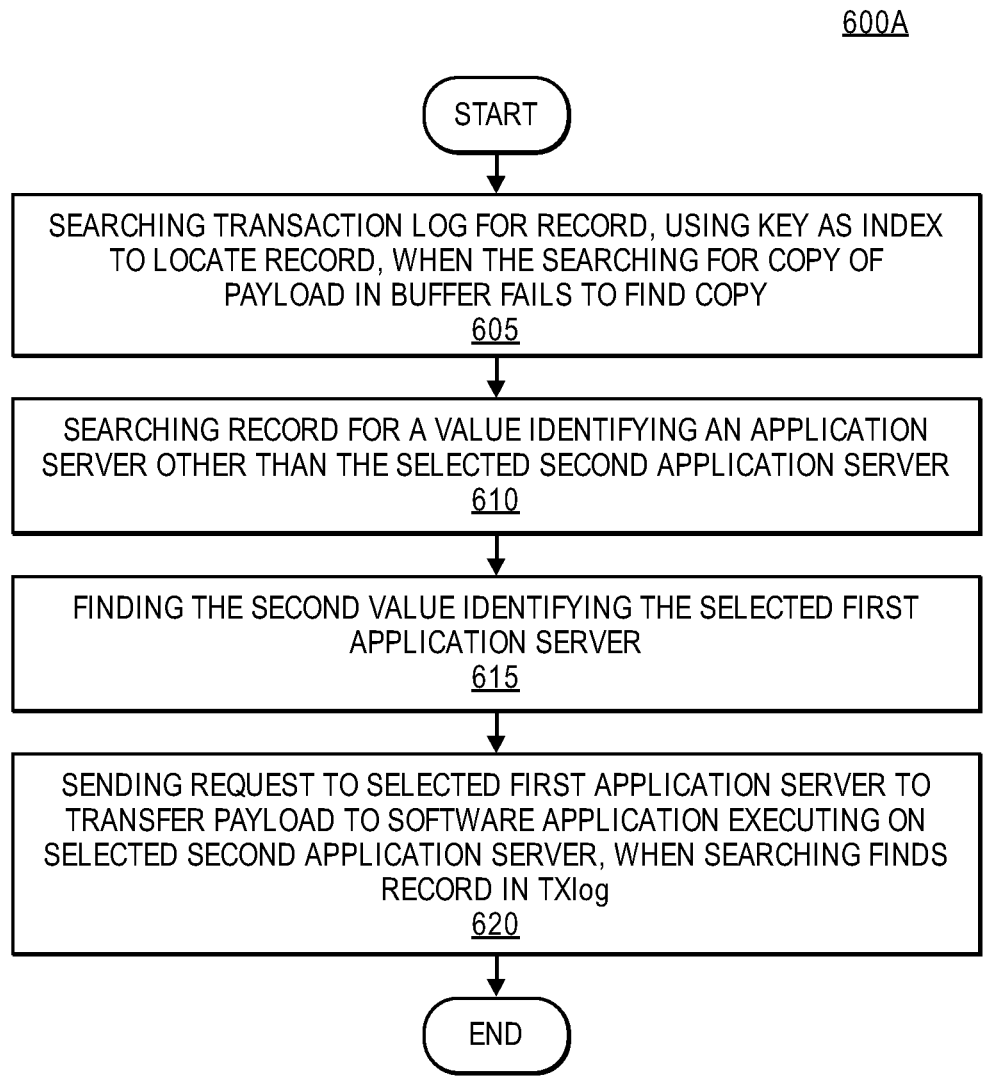
FIG. 6A is a flow chart of yet another process in accordance with an embodiment of the invention.
Figure 6B:
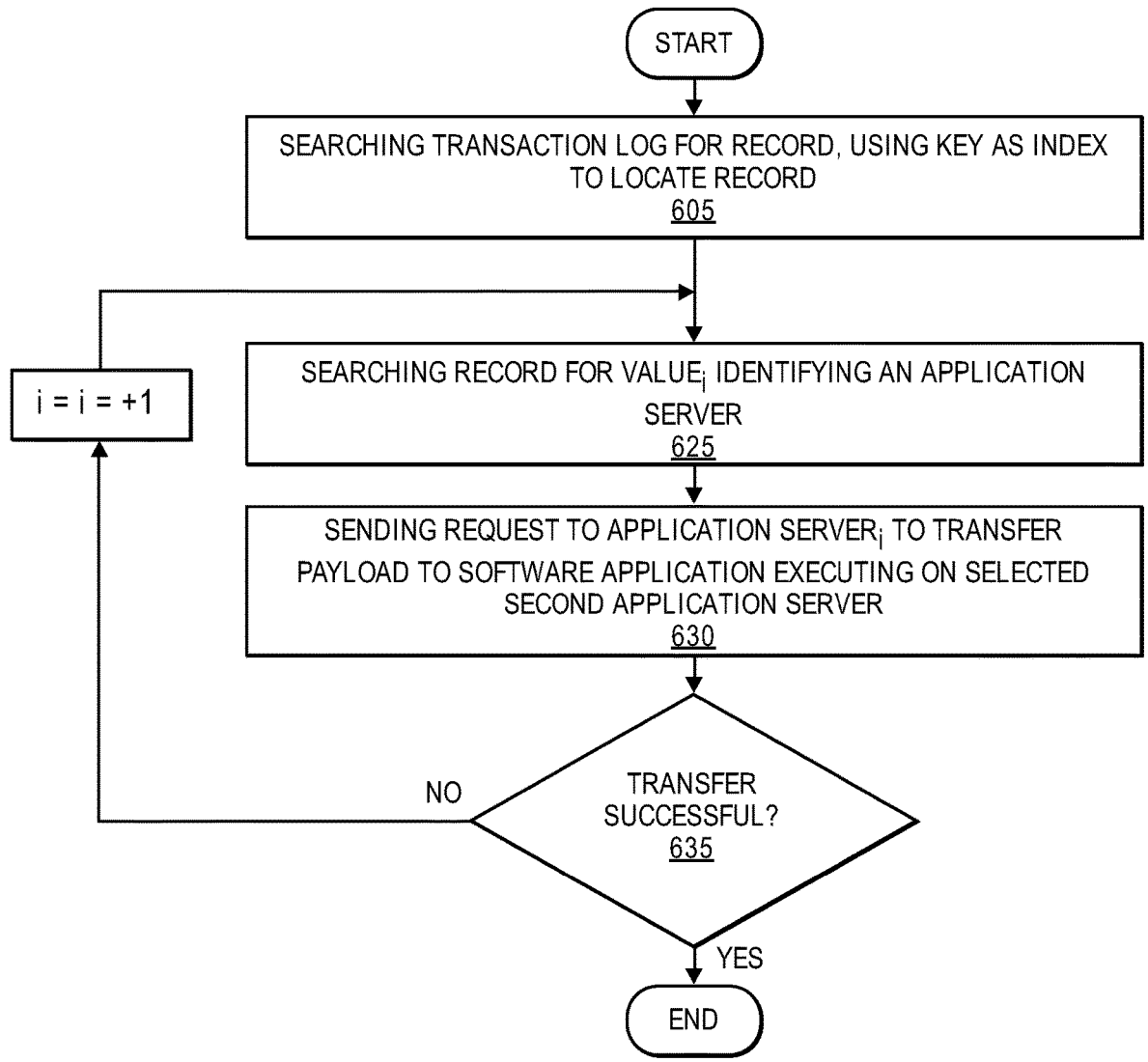
FIG. 6B is a flow chart of a process in accordance with another embodiment of the invention.

According to one embodiment of the invention, when processing logic 505 searches first for a copy of a payload of data in the buffer of the selected second application server and it is not found, the process continues as describe with reference to FIG. 6A. In particular, processing logic 605 in the software application 303 executing on the selected second application server $300_4$ next searches the transaction log 301 for a record, using the corresponding key as an index to locate the record, when the first searching fails to find the copy. At 610, having found record 302 in FIG. 3A, as an example, the process then searches the record 302 for a value identifying an application server other than the selected second application server, finds at 615 the second value (e.g., "1" in FIG. 3A) in the record 302 identifying the selected first application server $300_1$, and sends at 620 a request to the selected first application server to transfer the payload of data associated with the key K1 to the software application 303 executing on the selected second application server $300_4$.

The embodiment described above with reference to FIGS. 3A, 3B, 5 and 6A, works well when application 303 has been executing for some time and has an accurate record of the history of keys previously read and corresponding payloads exported. The values of the keys increase monotonically and so application 303 can detect whether a key in a sequence of keys is missing, and if so, the process moves on to the steps described above with reference to FIG. 6A. However, when an application server is recently elected to perform the function of capturing data that has been changed in a persistent data store and exporting or transferring a record of such to an external system, there may be payloads associated with a lower key value than those payloads currently stored in the recently selected application server's buffer that the application 303 is unaware about. For example, if the selected application server was recently switched from being the selected backup application server to the primary application server, its buffer may not contain payloads associated with the oldest, or newest, transactions conducted with the permanent data store that have yet to be exported, and yet the sequence of the values of the keys in the buffer would appear normal or unbroken. Thus, in any case, according to one embodiment of the invention, processing logic 505 does not search first for a copy of a payload of data in the buffer of the selected second application server and, if found, read the copy from the buffer and transmit it outside the cluster, as depicted in the flow diagram of FIG. 5. Rather, one embodiment proceeds according to the flow diagram depicted in FIG. 4 directly to the flow diagram depicted in FIG. 6B.

In this embodiment, processing logic 605 in software application 303 executing on the selected second application server $300_4$ searches the transaction log 301 for locations from which to retrieve copies of payloads of data, using the respective key in the records of the transaction log 301 as an index to identify the copy that should be exported next. In particular, the selected second application server $300_4$ searches for a record in the transaction log with the lowest key value, indicating the corresponding payload should be exported first before other payloads to maintain consistency of the events being exported in relation to the order in which the data change events were conducted with the permanent data store. In the example illustrated in FIG. 3A, there is only one record 302 in the transaction log, and so that record is, by default, the record with the lowest key value. In the continuing example illustrated in FIG. 3B, there are two records 302 and 306. Record 302 has a key value of K1, and record 306 has a key value of K2, so record 302 still has the lowest key value and is therefore selected.

Having found the record in the transaction log with the lowest key value, processing logic 625 then retrieves and searches that record for the first occurrence of a value identifying an application server from which to retrieve the payload associated with the lowest key value. In the examples illustrated in FIGS. 3A and 3B, record 302 in the transaction log has the lowest key value, and so that record is searched for the first occurrence of a value identifying an application server from which to retrieve the payload. The value of the first entry in the record identifying an application server from which to retrieve the payload associated with the key is "4". Processing logic 630 then sends a request to application server $300_4$ to transfer the corresponding payload to software application 303 executing on the same application server $300_4$. If, for any reason, the request by processing logic 630 fails to return the payload for exporting by software application 303, the processing logic at 635, 640 moves to the next entry or occurrence in the record providing a value identifying another application server from which to retrieve the payload associated with the lowest key value. In the examples illustrated in FIGS. 3A and 3B, the next entry in record 302 has a value of "1" identifying application server $300_1$ from which to next attempt to retrieve the payload. Processing logic 630 then sends a second request to application server $300_1$ to transfer the corresponding payload to software application 303 executing on the same application server $300_4$. Finally, if that request fails to return the payload for exporting by software application 303, the processing logic at 640 and 625 moves to the next entry or occurrence in the record to search for a value identifying another application server from which to retrieve the payload associated with the lowest key value. In the examples illustrated in FIGS. 3A and 3B, the next entry in record 302 has a value of "3" identifying application server $300_3$ from which to next attempt to retrieve the payload. Processing logic 630 then sends a third request to application server $300_3$ to transfer the corresponding payload to software application 303 executing on the same application server $300_4$.

Figure 7:
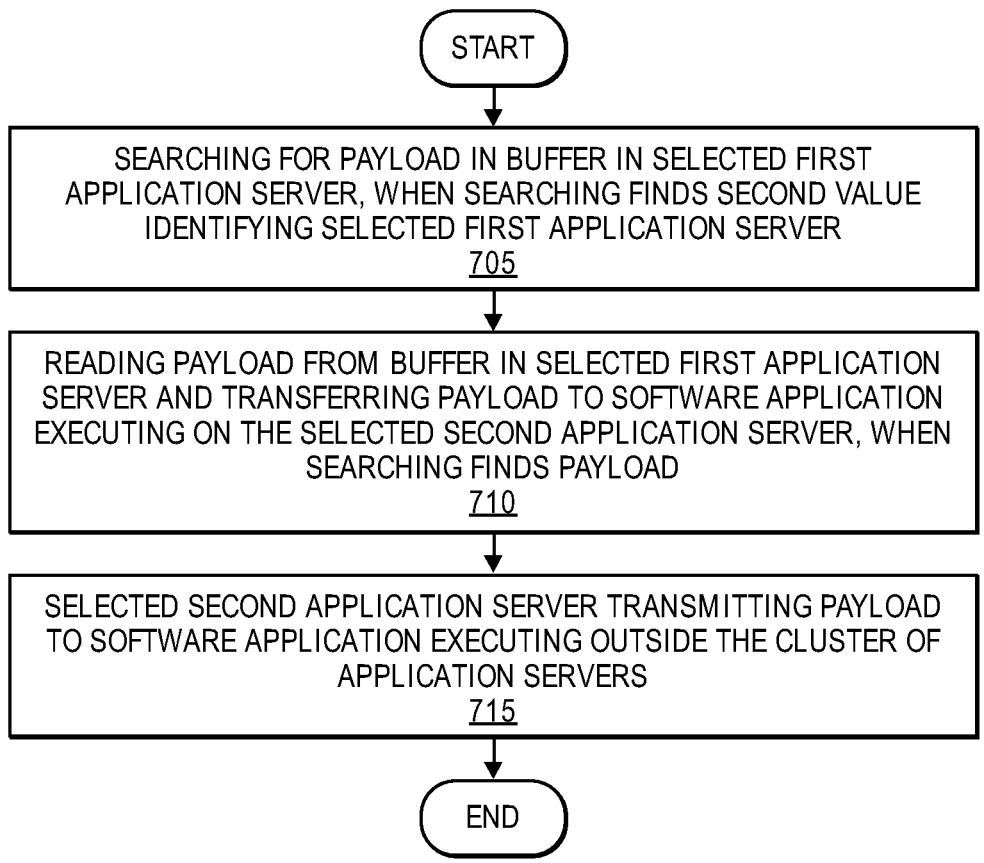
FIG. 7 is a flow chart of process in accordance with an embodiment of the invention.

Whether the processing logic at 620 or 630 sends the request to an application server to transfer a payload to the software application 303 executing on the application server selected to perform the function of capturing and exporting changed data in the order in which the data was changed in the persistent data store, the process moves on in either embodiment as depicted in FIG. 7 at 700. The software application executing on the application server to which the request was transmitted searches at 705 for the payload associated with the key in its buffer, using the key as an index to locate the payload in the buffer. When found, the software application reads the payload from the buffer at 710 and transfers it to software application 303. The software application 303 then is in a position thereafter to export the payload to an external system.

Figure 8:
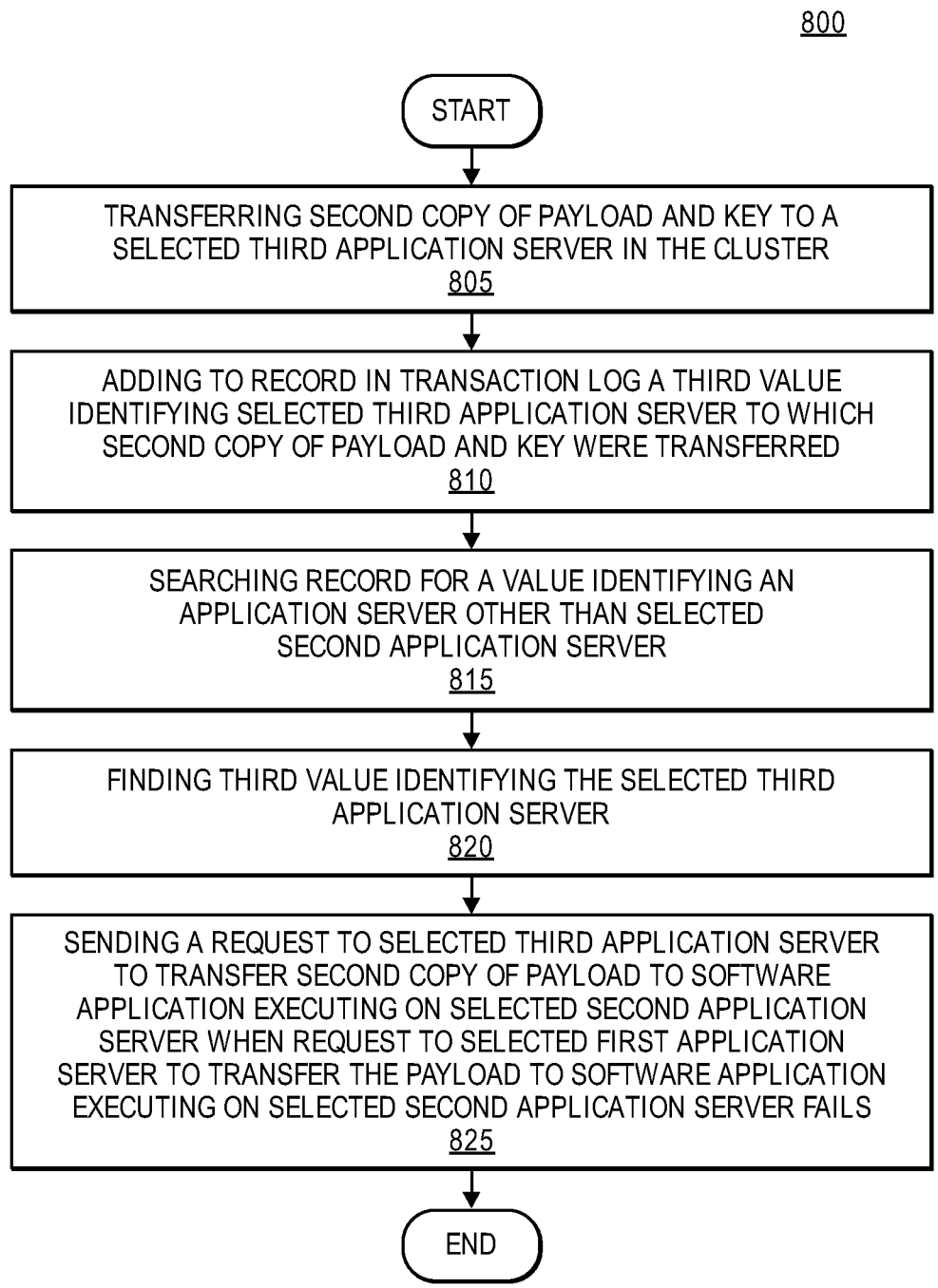
FIG. 8 is a flow chart of yet another process in accordance with an embodiment of the invention.

With reference to FIGS. 3A and 8, as discussed above, one embodiment of the invention optionally further transfers, as depicted at 342 at 805, a second copy of the payload of data and the corresponding key to a selected third application server in the cluster, in this example, application server $300_3$. The selected third application server in the cluster is elected, or selected, as a backup to perform the function 303 of capturing events that occur in the cluster and exporting or transferring a record or such to an external system, in the event that the selected second application server, or the capturing and exporting function performed by the selected second application server, fails or otherwise ceases to operate. This third application server in the cluster is elected as the backup application server in the cluster to perform the function according to a protocol or algorithm and/or based on a topology of the cluster, operational characteristics, and/or other criteria. The second copy of the payload of data is stored in a buffer $305_3$ in the memory of the selected third application server $300_3$. When the embodiment further transfers, as depicted at 342 and 805 a second copy of the payload of data and the corresponding key to a selected third application server in the cluster, then a third value 220 (e.g., a pointer with a value of "3") is added to the record identifying the selected third application server $300_3$ to which the second copy of the payload of data and corresponding key were transferred.

At 815, the process may subsequently search the record 302 for the third value identifying an application server if and when the request fails at 620 for the selected first application server to transfer the payload of data associated with the key K1 to the software application 303 executing on the selected second application server $300_4$. When found at 820, the process at 825 sends a request to a selected third application server in the cluster, in this example, application server $300_3$, to transfer the payload associated with the key to the software application 303 executing on application server $300_4$.

Likewise, with reference to FIGS. 3B and 8, one embodiment further transfers, as depicted at 346, a second copy of a different payload of data and its corresponding key to a different selected third application server in the cluster, in this example, application server $300_1$. The second copy of the payload of data is stored in the buffer $305_1$ in the memory of the selected third application server $300i$. When the embodiment further transfers, as depicted at 346 and 805 a second copy of the payload of data and the corresponding key to a selected third application server in the cluster, then a third value 220 (e.g., a pointer with a value of "1") is added to the record identifying the selected third application server $300_1$ to which the second copy of the payload of data and corresponding key were transferred. At 815, the process searches the record 306 for the third value identifying an application server when the request fails at 630 for the selected first application server to transfer the payload of data associated with the key K2 to the software application 303 executing on the selected second application server $300_4$. At 815, the process may subsequently search the record 306 for the third value identifying an application server if and when the request fails at 630 for the selected first application server to transfer the payload of data associated with the key K2 to the software application 303 executing on the selected second application server $300_4$. When found at 820, the process at 825 sends a request to a selected third application server in the cluster, in this example, application server $300_1$, to transfer the payload associated with the key to the software application 303 executing on application server $300_4$. To the extent possible, the contents of buffer $305_4$ read and exported by new software application 350.

Figure 3C:
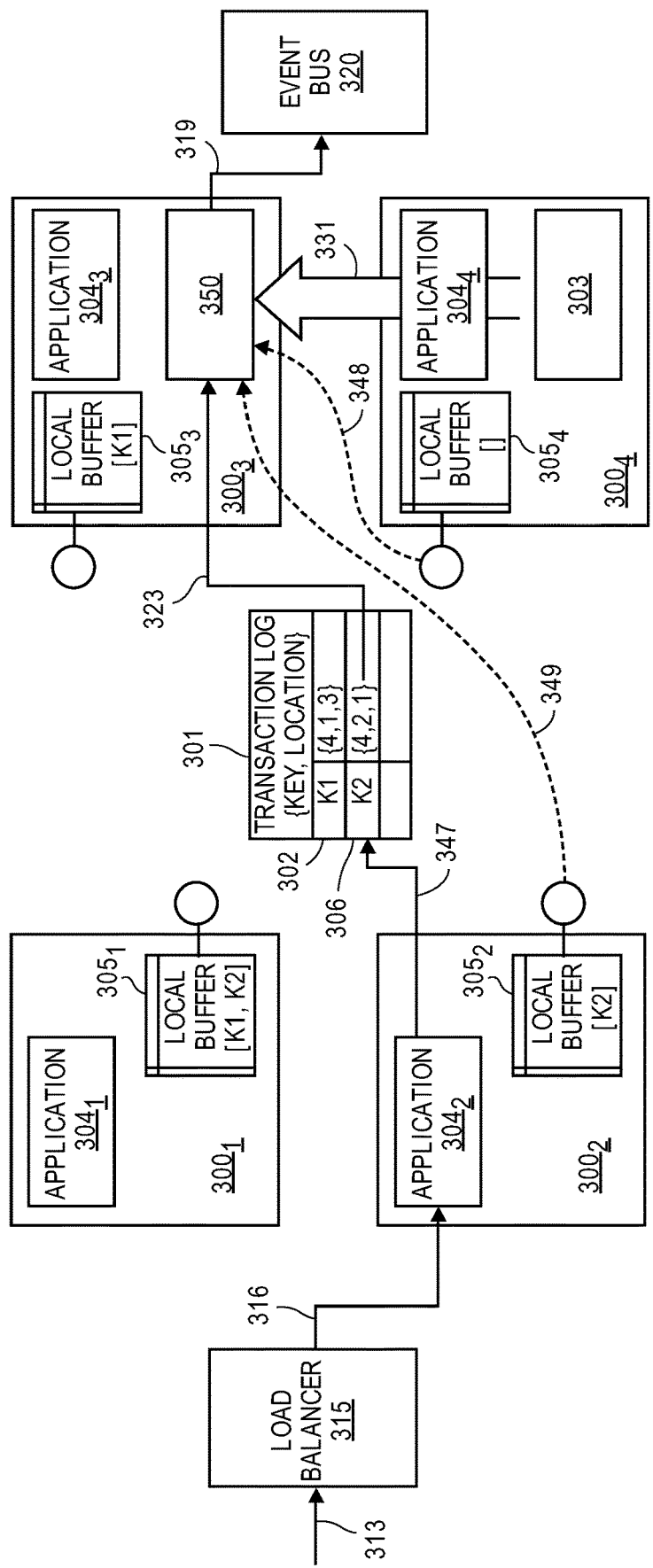
FIG. 3C depicts a system and process in accordance with yet another aspect of an embodiment of the invention.

FIG. 3C depicts a scenario in which software application 303, and/or buffer $305_4$, and/or the selected application server $300_4$ on which application 303 executes and in which buffer $305_4$ resides, fails after exporting the payload associated with key K1, but before or during the export of the payload of data associated with key K2. In one embodiment, a new software application 350 takes over the functionality of capturing changed data and exporting it to an external system, as depicted at 331. The software application searches the transaction log, locates and reads record 306 at 323, the record indexed by key K2. The software application reads the first entry in record 306 with a value of "4" and attempts at 348 to request the payload from application server $300_4$. The request fails, and so the software application reads the second entry in the record with a value of "2" and attempts at 349 to request the payload from application server $300_2$.

Thus, described herein is a system to execute within a host organization, wherein the system includes a cluster of application servers, each having at least a processor and a memory therein, and access to a persistent data store, the processor and memory to execute instructions on the system, the instructions providing: means for storing in a buffer in a memory of a selected first application server a payload of data associated with a transaction performed by a software application executing on the selected first application server with the persistent data store and a corresponding key indicating when the transaction was conducted with the persistent data store, such as a logical point in time at which the associated transaction was committed to the database; means for transferring a copy of the payload of data and the corresponding key to a selected second application server in the cluster; and means for creating a record in an entry in a transaction log stored in a database to which the cluster of applications servers has access. In one embodiment, the record includes the corresponding key, a first value identifying the selected second application server to which the copy of the payload of data and corresponding key were transferred, and a second value identifying the selected first application server in which the payload of data and corresponding key were stored.

One embodiment further includes means for receiving a first user input at a load balancer for the cluster; means for selecting, by the load balancer, an application server in the cluster to which to transmit the first user input as the selected first application server; means for transmitting the first user input to the selected first application server; and means for performing, by the software application executing on the selected first application server, the transaction with the persistent data store, responsive to the first user input. One embodiment further includes means for storing in a buffer in the memory of the selected second application server the copy of the payload of data and the corresponding key. Such an embodiment further includes means for searching first for the copy of the payload of data in the memory buffer in the selected second application server, using the corresponding key as an index to locate the copy; and means for reading the copy of the payload of data from the memory buffer in the selected second application server, and transmitting the copy of the payload of data to a software application executing outside the cluster of application servers, when the first searching finds the copy.

One embodiment of the invention further includes means searching second the transaction log for the record, using the corresponding key as an index to locate the record, when the first searching fails to find the copy; and means for searching third the record for a value identifying an application server other than the selected second application server, finding the second value identifying the selected first application server, and sending a request to the selected first application server to transfer the payload of data to the software application executing on the selected second application server, when the second searching finds the record. This embodiment may further include means for searching fourth for the payload of data in the memory buffer in the selected first application server, when the third searching finds the second value identifying the selected first application server; and means for reading the payload of data from the memory buffer in the selected first application server and transferring the payload of data to the software application executing on the selected second application server, when the fourth searching finds the payload. This embodiment may further include means for transmitting the payload of data to the software application executing outside the cluster of application servers.

One embodiment of the invention further includes means for transferring a second copy of the payload of data and the corresponding key to a selected third application server in the cluster; means for adding to the record in the transaction log a third value identifying the selected third application server to which the second copy of the payload of data and corresponding key were transferred; and means for searching fourth the record for a value identifying an application server other than the selected second application server, finding the third value identifying the selected third application server, and sending a request to the selected third application server to transfer the second copy of the payload of data to the software application executing on the selected second application server, when the request to the selected first application server to transfer the payload of data to the software application executing on the selected second application server fails.

Figure 9A:
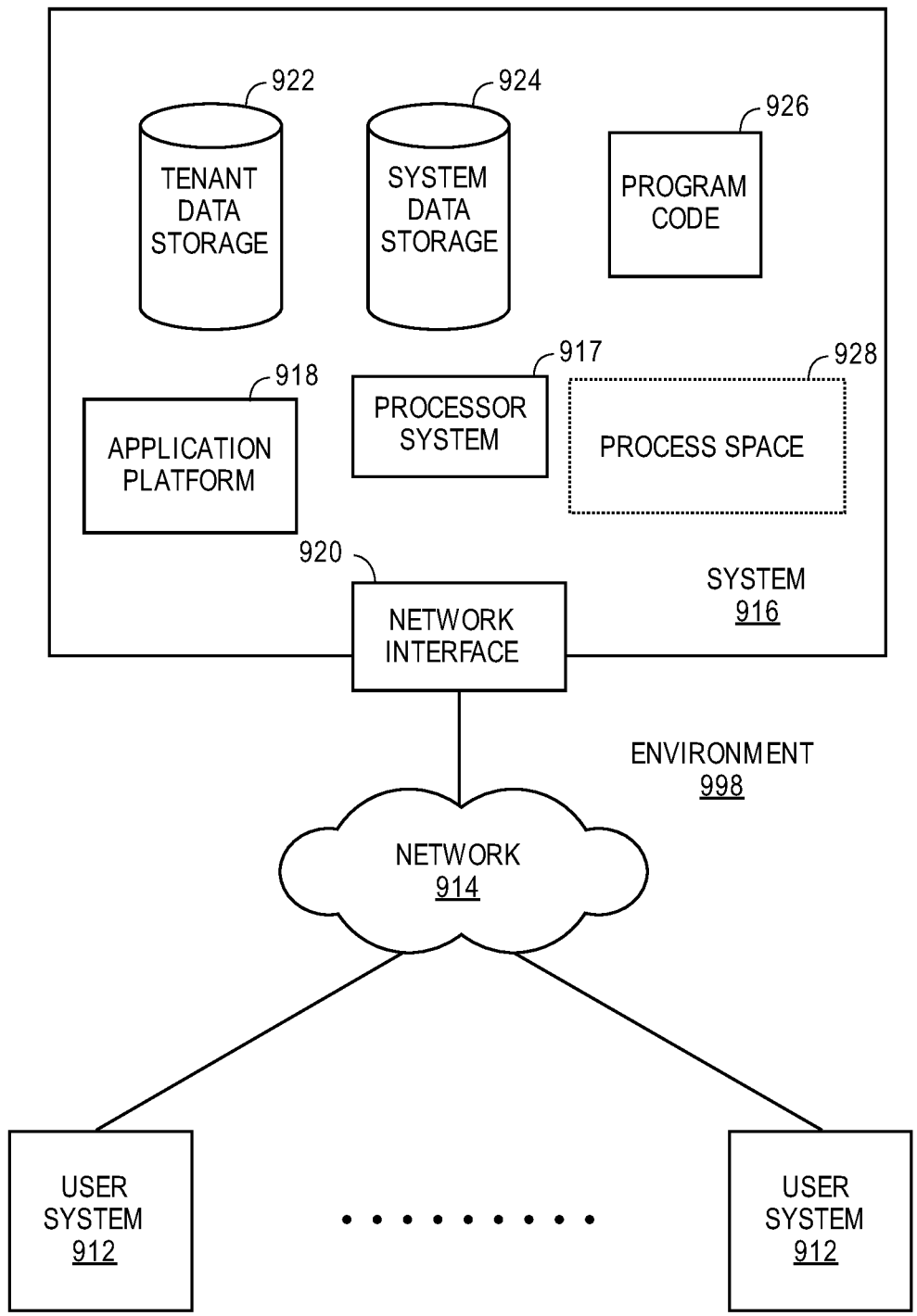
FIG. 9A illustrates a block diagram of an environment in which an on-demand database service may operate in accordance with the described embodiments.

FIG. 9A illustrates a block diagram of an environment 998 in which an on-demand database service may operate in accordance with the described embodiments. Environment 998 may include user systems 912, network 914, system 916, processor system 917, application platform 918, network interface 920, tenant data storage 922, system data storage 924, program code 926, and process space 928. In other embodiments, environment 998 may not have all of the components listed and/or may have other elements instead of, or in addition to, those listed above.

Environment 998 is an environment in which an on-demand database service exists. User system 912 may be any machine or system that is used by a user to access a database user system. For example, any of user systems 912 can be a handheld computing device, a mobile phone, a laptop computer, a workstation, and/or a network of computing devices. As illustrated in FIG. 9A (and in more detail in FIG. 9B) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" is used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9A, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9A, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9A include conventional, well-known elements that are explained only briefly here. For example, each user system 912 may include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9B:
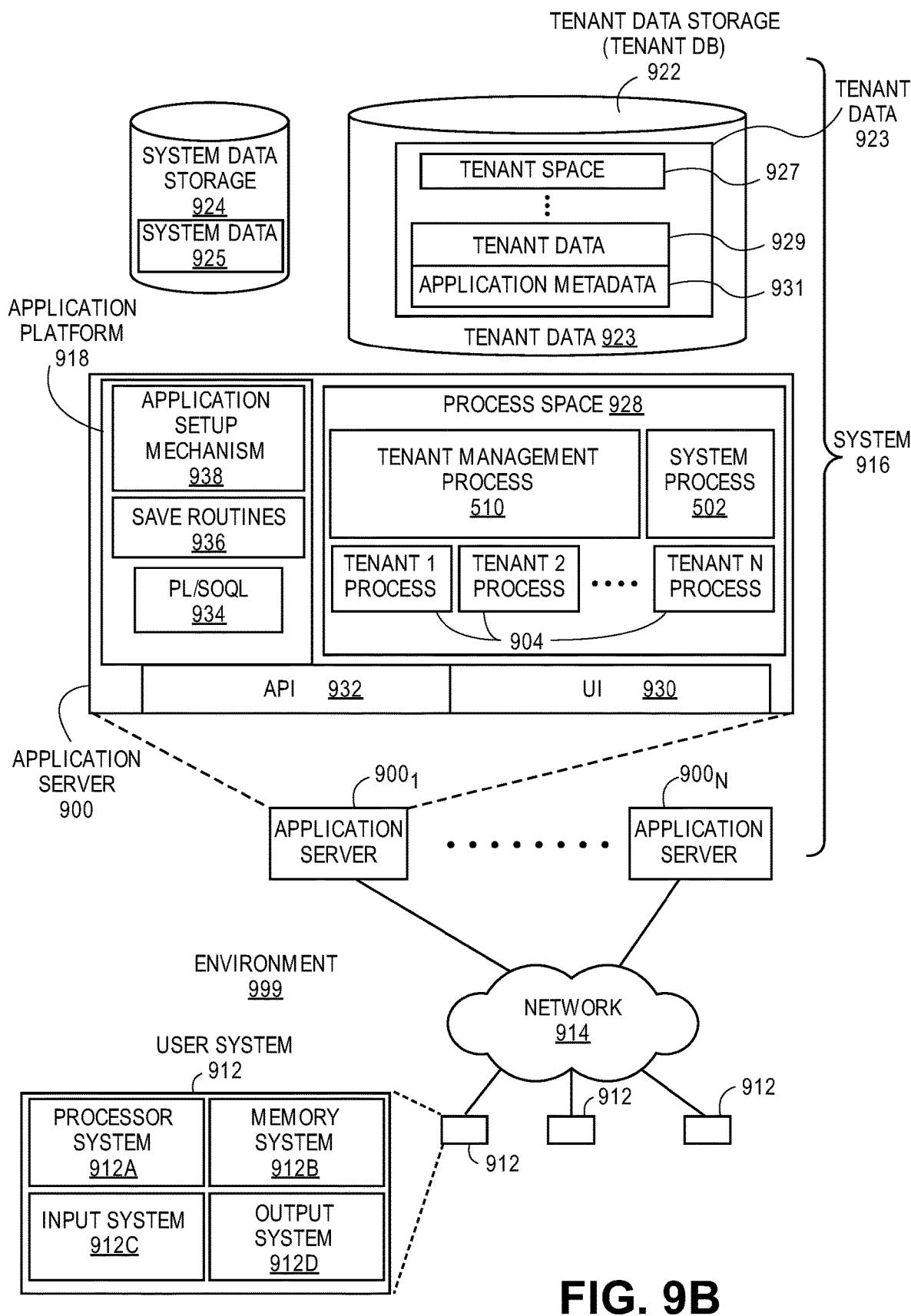
FIG. 9B illustrates another block diagram of an embodiment of elements of FIG. 9A and various possible interconnections between such elements in accordance with the described embodiments.

FIG. 9B illustrates another block diagram of an embodiment of elements of FIG. 9A and various possible interconnections between such elements in accordance with the described embodiments. FIG. 9B also illustrates environment 999. However, in FIG. 9B, the elements of system 916 and various interconnections in an embodiment are illustrated in further detail. More particularly, FIG. 9B shows that user system 912 may include a processor system 912A, memory system 912B, input system 912C, and output system 912D. FIG. 9B shows network 914 and system 916. FIG. 9B also shows that system 916 may include tenant data storage 922, having therein tenant data 923, which includes, for example, tenant storage space 927, tenant data 929, and application metadata 931. System data storage 924 is depicted as having therein system data 925. Further depicted within the expanded detail of application servers $900_{1-N}$ are User Interface (UI) 930, Application Program Interface (API) 932, application platform 918 includes PL/SOQL 934, save routines 936, application setup mechanism 938, process space 928 includes system process space 902, tenant 1-N process spaces 904, and tenant management process space 910. In other embodiments, environment 999 may not have the same elements as those listed above and/or may have other elements instead of, or in addition to, those listed above.

User system 912, network 914, system 916, tenant data storage 922, and system data storage 924 were discussed above in FIG. 9A. As shown by FIG. 9B, system 916 may include a network interface 920 (of FIG. 9A) implemented as a set of HTTP application servers 900, an application platform 918, tenant data storage 922, and system data storage 924. Also shown is system process space 902, including individual tenant process spaces 904 and a tenant management process space 910. Each application server 900 may be configured to tenant data storage 922 and the tenant data 923 therein, and system data storage 924 and the system data 925 therein to serve requests of user systems 912. The tenant data 923 might be divided into individual tenant storage areas (e.g., tenant storage space 927), which can be either a physical arrangement and/or a logical arrangement of data. Within each tenant storage space 927, tenant data 929, and application metadata 931 might be similarly allocated for each user. For example, a copy of a user's most recently used (MRU) items might be stored to tenant data 929. Similarly, a copy of MRU items for an entire organization that is a tenant might be stored to tenant storage space 927. A UI 930 provides a user interface and an API 932 provides an application programmer interface into system 916 resident processes to users and/or developers at user systems 912. The tenant data and the system data may be stored in various databases, such as one or more Oracle™ databases.

Application platform 918 includes an application setup mechanism 938 that supports application developers' creation and management of applications, which may be saved as metadata into tenant data storage 922 by save routines 936 for execution by subscribers as one or more tenant process spaces 904 managed by tenant management process space 910 for example. Invocations to such applications may be coded using PL/SOQL 934 that provides a programming language style interface extension to API 932. Invocations to applications may be detected by one or more system processes, which manages retrieving application metadata 931 for the subscriber making the invocation and executing the metadata as an application in a virtual machine.

Each application server 900 may be communicably coupled to database systems, e.g., having access to system data 925 and tenant data 923, via a different network connection. For example, one application server 900$_1$ might be coupled via the network 914 (e.g., the Internet), another application server 900$_{N-1}$ might be coupled via a direct network link, and another application server 900$_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 912 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user may hit three different application servers 900, and three requests from different users may hit the same application server 900. In this manner, system 916 is multitenant, in which system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 900 to request and update system-level and tenant-level data from system 916 that may require sending one or more queries to tenant data storage 922 and/or system data storage 924. System 916 (e.g., an application server 900 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10:
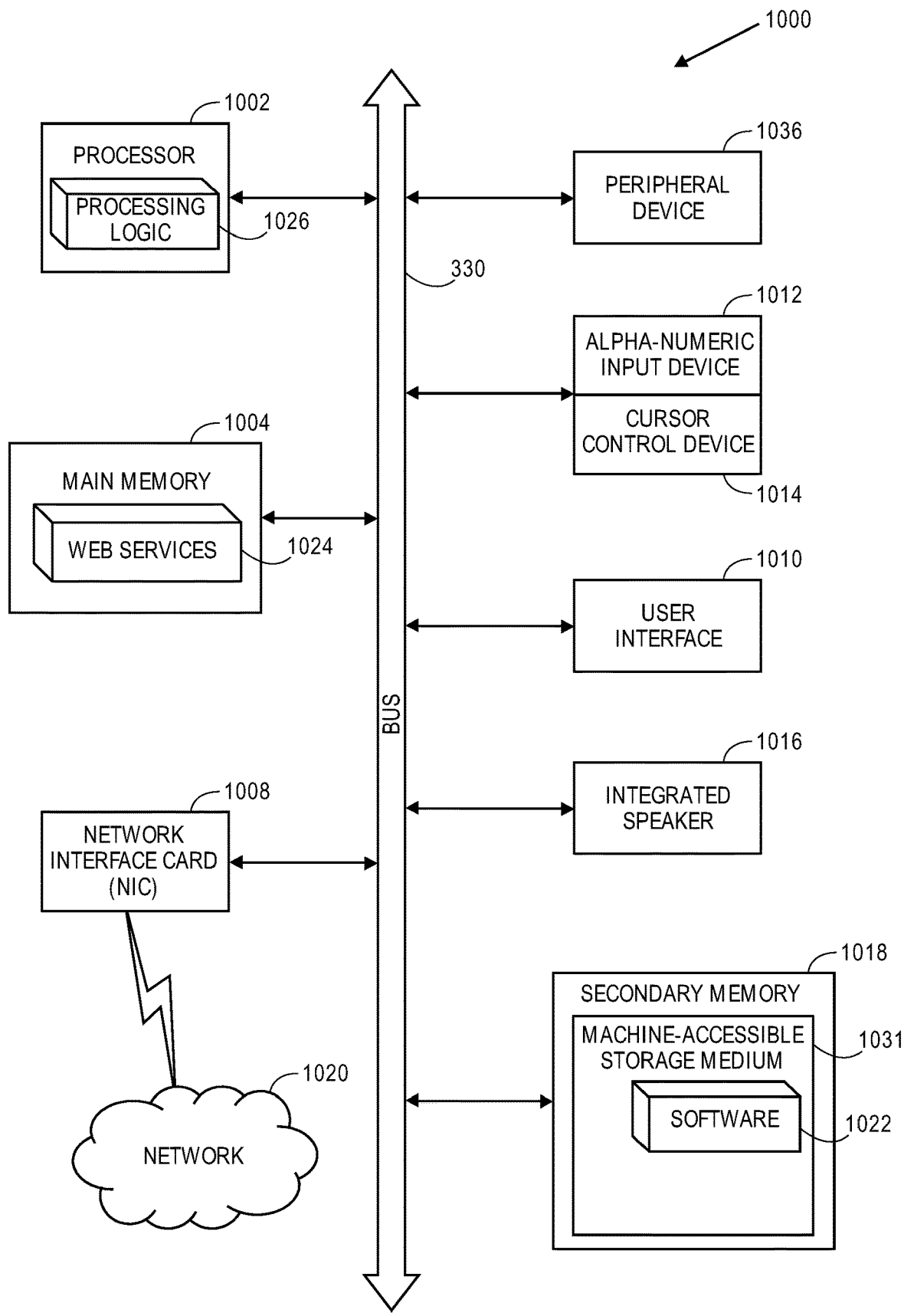
FIG. 10 illustrates a diagrammatic representation of a machine in the exemplary form of a computer system, in accordance with one embodiment.

FIG. 10 illustrates a diagrammatic representation of a machine 1000 in the exemplary form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes a web services 1024 by which to communicate with another web services platform, retrieve, and parse a schema to identify methods provided by the web service at the other web services platform in accordance with described embodiments. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality that is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a cluster of application servers, each having at least a processor and a memory therein, and access to a persistent data store, the method comprising:
    a software application executing on a selected first application server in the cluster performing the steps of:
        storing in a buffer in the memory of the selected first application server a payload of data associated with a transaction performed by the software application with the persistent data store and a corresponding key that indicates a logical point in time at which the associated transaction was committed to the persistent data store, wherein the key sequences the associated transaction based on the order in which it was performed with the persistent data store when a plurality of transactions are sent to an external system;

transferring a copy of the payload of data and the corresponding key to a selected second application server in the cluster; and creating a record in an entry in a transaction log stored in a database system to which the cluster of applications servers has access, the record including: the corresponding key, a first value identifying the selected second application server to which the copy of the payload of data and corresponding key were transferred, and a second value identifying the selected first application server in which the payload of data and corresponding key were stored, wherein the database system uses the key to restrict recovery operations from altering changes made to the database system.

2. The method of claim 1, wherein further comprising:
receiving a first user input at a load balancer for the cluster;
selecting, by the load balancer, an application server in the cluster to which to transmit the first user input as the selected first application server;
transmitting the first user input to the selected first application server; and
performing, by the software application executing on the selected first application server, a transaction with the persistent data store, responsive to the first user input.

3. The method of claim 1, further comprising a software application executing on the selected second application server performing the steps of storing in a buffer in the memory of the selected second application server the copy of the payload of data and the corresponding key.

4. The method of claim 3, further comprising:
the software application executing on the selected second application server performing the steps of:
searching first for the copy of the payload of data in the memory buffer in the selected second application server, using the corresponding key as an index to locate the copy; and
reading the copy of the payload of data from the memory buffer in the selected second application server, and transmitting the copy of the payload of data to a software application executing outside the cluster of application servers, when the first searching finds the copy.

5. The method of claim 4, further comprising:
the software application executing on the selected second application server performing the steps of:
searching second the transaction log for the record, using the corresponding key as an index to locate the record, when the first searching fails to find the copy; and
searching third the record for a value identifying an application server other than the selected second application server, finding the second value identifying the selected first application server, and sending a request to the selected first application server to transfer the payload of data to the software application executing on the selected second application server, when the second searching finds the record.

6. The method of claim 5, further comprising:
the software application executing on the first application server performing the steps of:
searching fourth for the payload of data in the memory buffer in the selected first application server, when the third searching finds the second value identifying the selected first application server; and
reading the payload of data from the memory buffer in the selected first application server and transferring the payload of data to the software application executing on the selected second application server, when the fourth searching finds the payload.

7. The method of claim 6, further comprising the software application executing on the selected second application server transmitting the payload of data to the software application executing outside the cluster of application servers.

8. The method of claim 5, further comprising:
the software application executing on the selected first application server in the cluster further performing the steps of:
transferring a second copy of the payload of data and the corresponding key to a selected third application server in the cluster;
adding to the record in the transaction log a third value identifying the selected third application server to which the second copy of the payload of data and corresponding key were transferred; and
the software application executing on the selected second application server performing the steps of:
searching fourth the record for a value identifying an application server other than the selected second application server, finding the third value identifying the selected third application server, and sending a request to the selected third application server to transfer the second copy of the payload of data to the software application executing on the selected second application server, when the request to the selected first application server to transfer the payload of data to the software application executing on the selected second application server fails.

9. A system to execute within a host organization, wherein the system comprises a cluster of application servers, each having at least a processor and a memory therein, and access to a persistent data store, the processor and memory to execute a software application executing on a selected first application server in the cluster performing the steps of:
storing in a buffer in the memory of the selected first application server a payload of data associated with a transaction performed by the software application with the persistent data store and a corresponding key that indicates a logical point in time at which the associated transaction was committed to the persistent data store, wherein the key sequences the associated transaction based on the order in which it was performed with the persistent data store when a plurality of transactions are sent to an external system;
transferring a copy of the payload of data and the corresponding key to a selected second application server in the cluster; and
creating a record in an entry in a transaction log stored in a database system to which the cluster of applications servers has access, the record including: the corresponding key, a first value identifying the selected second application server to which the copy of the payload of data and corresponding key were transferred, and a second value identifying the selected first application server in which the payload of data and corresponding key were stored, wherein the database system uses the key to restrict recovery operations from altering changes made to the database system.

10. The system of claim 9, further comprising:
means for receiving a first user input at a load balancer for the cluster;
means for selecting, by the load balancer, an application server in the cluster to which to transmit the first user input as the selected first application server;
means for transmitting the first user input to the selected first application server; and
means for performing, by the software application executing on the selected first application server, a transaction with the persistent data store, responsive to the first user input.

11. The system of claim 9, further comprising means for storing in a buffer in the memory of the selected second application server the copy of the payload of data and the corresponding key.

12. The system of claim 11, further comprising:
means for searching first for the copy of the payload of data in the memory buffer in the selected second application server, using the corresponding key as an index to locate the copy; and
means for reading the copy of the payload of data from the memory buffer in the selected second application server, and transmitting the copy of the payload of data to a software application executing outside the cluster of application servers, when the first searching finds the copy.

13. The system of claim 12, further comprising:
means searching second the transaction log for the record, using the corresponding key as an index to locate the record, when the first searching fails to find the copy; and
means for searching third the record for a value identifying an application server other than the selected second application server, finding the second value identifying the selected first application server, and sending a request to the selected first application server to transfer the payload of data to the software application executing on the selected second application server, when the second searching finds the record.

14. The system of claim 13, further comprising:
means for searching fourth for the payload of data in the memory buffer in the selected first application server, when the third searching finds the second value identifying the selected first application server; and
means for reading the payload of data from the memory buffer in the selected first application server and transferring the payload of data to the software application executing on the selected second application server, when the fourth searching finds the payload.

15. The system of claim 14, further comprising the means for transmitting the payload of data to the software application executing outside the cluster of application servers.

16. The system of claim 13, further comprising:
means for transferring a second copy of the payload of data and the corresponding key to a selected third application server in the cluster;
means for adding to the record in the transaction log a third value identifying the selected third application server to which the second copy of the payload of data and corresponding key were transferred; and
means for searching fourth the record for a value identifying an application server other than the selected second application server, finding the third value identifying the selected third application server, and sending a request to the selected third application server to transfer the second copy of the payload of data to the software application executing on the selected second application server, when the request to the selected first application server to transfer the payload of data to the software application executing on the selected second application server fails.

17. Non-transitory computer readable storage media having instructions stored thereon that, when executed by a cluster of application servers, each having at least a processor and a memory therein, and access to a persistent data store, cause a selected first application server in the cluster to perform the steps of:
storing in a buffer in the memory of the selected first application server a payload of data associated with a transaction performed by the software application with the persistent data store and a corresponding key that indicates a logical point in time at which the associated transaction was committed to the persistent data store, wherein the key sequences the associated transaction based on the order in which it was performed with the persistent data store when a plurality of transactions are sent to an external system;
transferring a copy of the payload of data and the corresponding key to a selected second application server in the cluster; and
creating a record in an entry in a transaction log stored in a database system to which the cluster of applications servers has access, the record including: the corresponding key, a first value identifying the selected second application server to which the copy of the payload of data and corresponding key were transferred, and a second value identifying the selected first application server in which the payload of data and corresponding key were stored, wherein the database system uses the key to restrict recovery operations from altering changes made to the database system.

18. The non-transitory computer readable storage media of claim 17, further comprising instructions to perform the steps of:
receiving a first user input at a load balancer for the cluster;
selecting, by the load balancer, an application server in the cluster to which to transmit the first user input as the selected first application server;
transmitting the first user input to the selected first application server; and
performing, by the software application executing on the selected first application server, a transaction with the persistent data store, responsive to the first user input.

19. The non-transitory computer readable storage media of claim 17, further comprising instructions that cause a software application executing on the selected second application server to perform the steps of storing in a buffer in the memory of the selected second application server the copy of the payload of data and the corresponding key.

20. The non-transitory computer readable storage media of claim 19, further comprising instructions that causes the software application executing on the selected second application server to perform the steps of:
searching first for the copy of the payload of data in the memory buffer in the selected second application server, using the corresponding key as an index to locate the copy; and
reading the copy of the payload of data from the memory buffer in the selected second application server, and transmitting the copy of the payload of data to a software application executing outside the cluster of application servers, when the first searching finds the copy.

21. The non-transitory computer readable storage media of claim 20, further comprising instructions that cause the software application executing on the selected second application server to perform the steps of:
searching second the transaction log for the record, using the corresponding key as an index to locate the record, when the first searching fails to find the copy; and
searching third the record for a value identifying an application server other than the selected second application server, finding the second value identifying the selected first application server, and sending a request to the selected first application server to transfer the payload of data to the software application executing on the selected second application server, when the second searching finds the record.

22. The non-transitory computer readable storage media of claim 21, further comprising instructions that cause the software application executing on the first application server to perform the steps of:
searching fourth for the payload of data in the memory buffer in the selected first application server, when the third searching finds the second value identifying the selected first application server; and
reading the payload of data from the memory buffer in the selected first application server and transferring the payload of data to the software application executing on the selected second application server, when the fourth searching finds the payload.

23. The non-transitory computer readable storage media of claim 22, further comprising instructions that cause the software application executing on the selected second application server to perform the step of transmitting the payload of data to the software application executing outside the cluster of application servers.

24. The non-transitory computer readable storage media of claim 21, further comprising instructions that:
cause the software application executing on the selected first application server in the cluster to further perform the steps of:
transferring a second copy of the payload of data and the corresponding key to a selected third application server in the cluster;
adding to the record in the transaction log a third value identifying the selected third application server to which the second copy of the payload of data and corresponding key were transferred; and
cause the software application executing on the selected second application server to perform the steps of:
searching fourth the record for a value identifying an application server other than the selected second application server, finding the third value identifying the selected third application server, and sending a request to the selected third application server to transfer the second copy of the payload of data to the software application executing on the selected second application server, when the request to the selected first application server to transfer the payload of data to the software application executing on the selected second application server fails.

25. The method of claim 1:
wherein the cluster of application servers implement on-demand cloud computing services provided to subscribers of the cloud computing platform; and
wherein the user is associated with one of a plurality of customer organizations having subscriber access to the on-demand cloud computing services provided by the cloud computing platform.

26. The system of claim 9:
wherein the cluster of application servers implement on-demand cloud computing services provided to subscribers of the cloud computing platform; and
wherein the user is associated with one of a plurality of customer organizations having subscriber access to the on-demand cloud computing services provided by the cloud computing platform.

27. The non-transitory computer readable storage media of claim 17:
wherein the cluster of application servers implement on-demand cloud computing services provided to subscribers of the cloud computing platform; and
wherein the user is associated with one of a plurality of customer organizations having subscriber access to the on-demand cloud computing services provided by the cloud computing platform.

* * * * *